(12) United States Patent
Showa et al.

(10) Patent No.: US 10,755,740 B2
(45) Date of Patent: Aug. 25, 2020

(54) SPINDLE MOTOR

(71) Applicant: MINEBEA MITSUMI Inc., Nagano (JP)

(72) Inventors: Hideaki Showa, Nagano (JP); Daigo Nakajima, Tomi (JP); Tetsuo Kitamura, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/583,523

(22) Filed: Sep. 26, 2019

(65) Prior Publication Data

US 2020/0105299 A1   Apr. 2, 2020

(30) Foreign Application Priority Data

Sep. 28, 2018 (JP) ................................. 2018-184182
Jul. 3, 2019 (JP) ................................. 2019-124240

(51) Int. Cl.

| G11B 19/20 | (2006.01) |
|---|---|
| G11B 5/48 | (2006.01) |
| G11B 33/14 | (2006.01) |
| G11B 33/12 | (2006.01) |
| H02K 3/50 | (2006.01) |
| H02K 5/10 | (2006.01) |
| H02K 5/22 | (2006.01) |

(Continued)

(52) U.S. Cl.
CPC ........ *G11B 19/2009* (2013.01); *G11B 5/4806* (2013.01); *G11B 33/122* (2013.01); *G11B 33/1466* (2013.01); *H02K 3/50* (2013.01); *H02K 5/10* (2013.01); *H02K 5/225* (2013.01); *H02K 11/00* (2013.01); *G11B 19/2036* (2013.01); *G11B 25/043* (2013.01); *H02K 2203/03* (2013.01); *H02K 2211/03* (2013.01)

(58) Field of Classification Search
None
See application file for complete search history.

(56) References Cited

U.S. PATENT DOCUMENTS 9,742,239 B2 * 8/2017 Yoneda .................... H02K 5/10
9,935,528 B2 * 4/2018 Yoneda .................. H02K 5/225
(Continued)

FOREIGN PATENT DOCUMENTS

JP     2014239597 A  * 12/2014  ............. H02K 5/225
JP     5732835 B2   *  6/2015
(Continued)

*Primary Examiner* — William J Klimowicz
(74) *Attorney, Agent, or Firm* — Pearne & Gordon LLP

(57) ABSTRACT

A spindle motor includes a base plate in which a through hole is formed, a stator core that is provided inside the base plate and is wound with a coil, and a circuit board that is provided outside the base plate and to which a conducting wire of the coil drawn out to outside through the through hole is connected, wherein the through hole includes an inner opening that opens inward of the base plate, an outer opening that opens outward of the base plate, and an intermediate portion having a cylindrical shape that is provided between the inner opening and the outer opening, an enlarged opening is formed to be connected to the outer opening, the enlarged opening is offset to extend toward a side where the circuit board is not present, and the through hole is sealed with a sealing material.

7 Claims, 9 Drawing Sheets

(51) Int. Cl.
  *H02K 11/00*   (2016.01)
  *G11B 25/04*   (2006.01)

(56) References Cited

U.S. PATENT DOCUMENTS

| | | | |
|---|---|---|---|
| 2013/0038964 A1* | 2/2013 | Garbarino | H02K 3/521 |
| | | | 360/99.08 |
| 2013/0069460 A1* | 3/2013 | Yamazaki | H02K 3/52 |
| | | | 310/71 |
| 2014/0362470 A1* | 12/2014 | Taki | H02K 3/522 |
| | | | 360/99.08 |
| 2016/0164364 A1 | 6/2016 | Yoneda et al. | |
| 2016/0164365 A1 | 6/2016 | Yoneda et al. | |
| 2016/0254022 A1* | 9/2016 | Akagi | G11B 33/1446 |
| | | | 369/258.1 |
| 2020/0143832 A1* | 5/2020 | Hanzel | G11B 19/2036 |

FOREIGN PATENT DOCUMENTS

| | | | | |
|---|---|---|---|---|
| JP | 2016-111907 A | | 6/2016 | |
| JP | 2016158439 A | * | 9/2016 | ......... G11B 19/2036 |
| JP | 6133339 B2 | * | 5/2017 | |
| JP | 2018073444 A | * | 5/2018 | |

\* cited by examiner

SPINDLE MOTOR

CROSS REFERENCE TO RELATED APPLICATIONS

This application claims the benefit of Japanese Patent Application No. 2018-184182, filed on Sep. 28, 2018 and No. 2019-124240, filed on Jul. 3, 2019, which are hereby incorporated by reference in their entireties.

BACKGROUND

Technical Field

The present disclosure relates to a spindle motor.

Background

In a hard disk drive device that drives a hard disk, gas such as helium gas having a density lower than that of air may be enclosed in an internal space of a housing. A plurality of through holes are formed in a base plate defining the housing of the hard disk drive device. Conducting wires drawn out from coils of a stator core provided in the housing are connected to a flexible printed circuit board (hereinafter referred to as an FPC board) through the through holes. In such a hard disk drive device, the through holes through which the conducting wires pass are filled with and sealed by a sealing material, thereby preventing the gas such as helium gas from leaking out through the through holes in the base plate (for example, see Japanese Patent Application Laid-Open No. 2016-111907).

In such a hard disk drive device, when the through holes in the base plate are filled with the sealing material in a state where the conducting wires are inserted through the trough holes to seal the through holes in the base plate, air may be caught in the sealing material, whereby air bubbles may be formed in the through holes. When the sealing material is cured with air bubbles contained in the sealing material, the air bubbles in the sealing material may be thermally expanded, whereby the sealing material may be cracked. As a result, gas such as helium gas may leak out of the hard disk drive device through these cracks. In particular, when the air bubbles are formed around the conducting wires drawn out from the coils, the sealing performance may decrease.

The present disclosure is related to providing a technique capable of improving the sealing performance of a through hole formed in a base plate for inserting a conducting wire.

SUMMARY

According to a first aspect of the present disclosure, a spindle motor includes a base plate in which a through hole is formed, a stator core that is provided inside the base plate and is wound with a coil, and a circuit board that is provided outside the base plate and to which a conducting wire of the coil drawn out to outside through the through hole is connected, wherein the through hole includes an inner opening that opens inward of the base plate, an outer opening that opens outward of the base plate, and an intermediate portion having a cylindrical shape that is provided between the inner opening and the outer opening, an enlarged opening is formed to be connected to the outer opening, the enlarged opening is offset to extend toward a side where the circuit board is not present, and the through hole is sealed with a sealing material.

A spindle motor according to the present disclosure can improve the sealing performance of a through hole in a base plate.

DETAILED DESCRIPTION

Hereinafter, embodiments of the present disclosure will be described with reference to the drawings.

Figure 1:
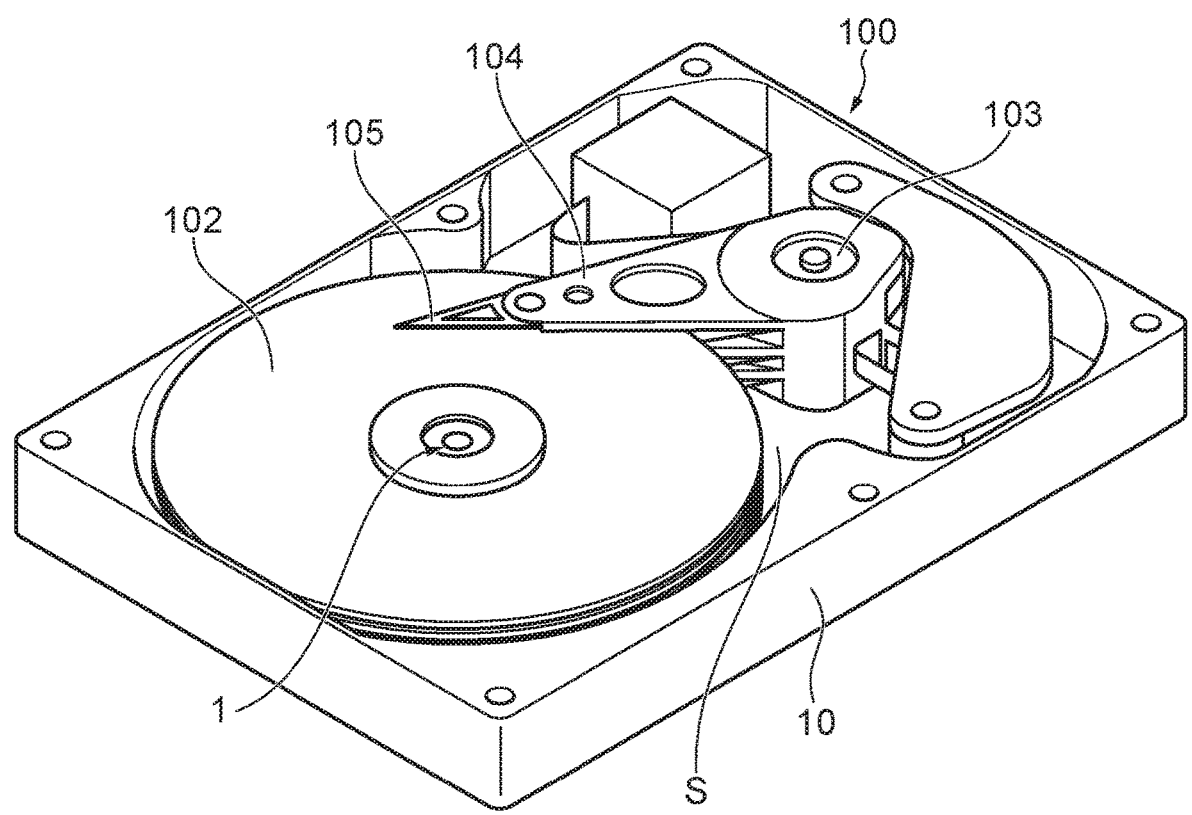
FIG. 1 is a perspective view for illustrating a schematic configuration of a hard disk drive device according to an embodiment of the present disclosure.

FIG. 1 is a perspective view for illustrating a schematic configuration of a hard disk drive device 100 to which a spindle motor 1 according to an embodiment of the present disclosure is applied. In the hard disk drive device 100, the spindle motor 1 includes a rotary part configured to fix a magnetic disk 102, and a stationary part including a base plate 10, so that the magnetic disk 102 is rotatably supported. A housing of the hard disk drive device 100 is formed by a cover (not illustrated) and the base plate 10. An internal space S defined by the cover and the base plate 10 is filled with gas (for example, helium gas, nitrogen gas, or mixed gas of helium and nitrogen) having a density lower than that of air.

In the hard disk drive device 100, a swing arm 104 is swingably supported by a bearing device 103, and a magnetic head 105 disposed at a tip end of the swing arm 104 moves over the rotating magnetic disk 102. Thus, the information can be recorded in the magnetic disk 102, and the information recorded in the magnetic disk 102 can be read.

Figure 2:
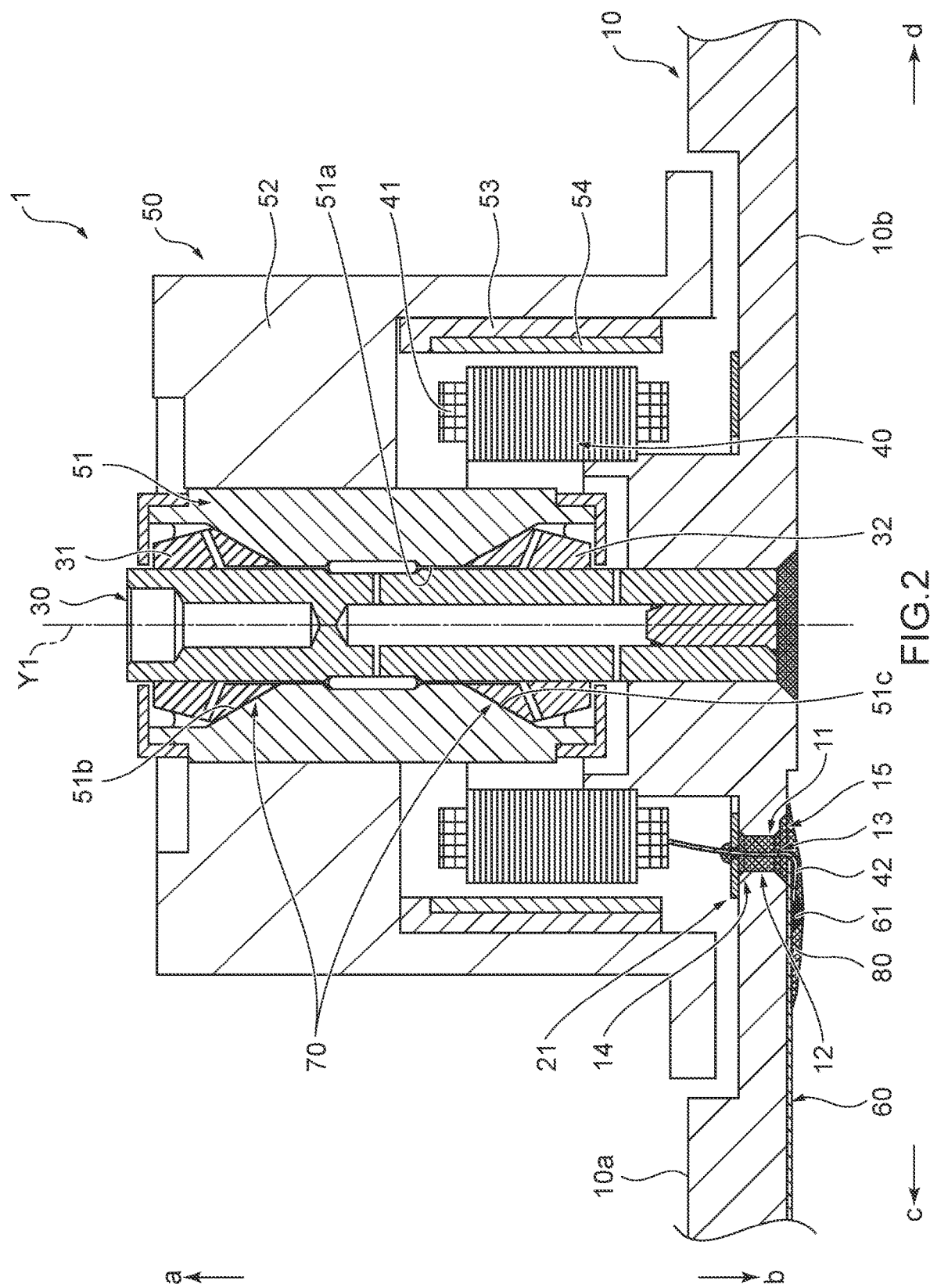
FIG. 2 is a cross-sectional view schematically illustrating a configuration of a spindle motor illustrated in FIG. 1.

FIG. 2 is a cross-sectional view schematically illustrating a configuration of the spindle motor 1 illustrated in FIG. 1. Hereinafter, for the convenience of the description, one side (in a direction of an arrow a) in a direction of an axis Y1 (hereinafter also referred to as an axial direction) which is a rotary axis of the spindle motor 1 in FIG. 2 is referred to as an upper side, and the other side (in a direction of an arrow b) is referred to as a lower side. One side (in a direction of an arrow c) in a direction (longitudinal direction of the base plate 10) perpendicular to the axis Y1 of the spindle motor 1 in FIG. 2 is referred to as a left side, and the other side (in a direction of an arrow d) is referred to as a right side. In the following description, when the positional relationship and directions of each member are used for the description, the positional relationship and the directions show relationship and directions merely in the drawings and do not show the actual positional relationship and directions of each member incorporated into an actual device.

The spindle motor 1 according to an embodiment of the present disclosure includes the base plate 10 in which a through hole 11 is formed, and a stator core 40 that is provided inside (on the upper side) of the base plate 10 and is wound with a coil 41. Furthermore, the spindle motor 1 includes a flexible printed circuit board (hereinafter referred to as an FPC board) 60 that is provided outside (on the lower side) of the base plate 10 and to which a conducting wire 42 of the coil 41 drawn out to the outside through the through hole 11 is connected.

The through hole 11 includes an upper opening 14 as an inner opening that opens inwardly of the base plate 10, a lower opening 13 as an outer opening that opens outwardly of the base plate 10, and a cylindrical hole 12 as an intermediate portion having a cylindrical shape that is provided between the upper opening 14 and the lower opening 13. In the through hole 11, an enlarged opening 15 is formed to be connected to the lower opening 13, and the enlarged opening 15 is offset to extend toward a side where the FPC board 60 is not present (in a direction closer to the axis Y1). The through hole 11 is sealed with a sealing material 80. Hereinafter, a configuration of the spindle motor 1 will be specifically described.

As illustrated in FIG. 2, the spindle motor 1 includes the base plate 10, a shaft 30 and the stator core 40 that are fixed to the base plate 10, and a rotor 50 that is rotatable about the shaft 30. The base plate 10 is formed of, for example, aluminum alloy, and includes an inside surface (inner surface 10a) to which the stator core 40 is to be fixed, and an outside surface (outer surface 10b) opposite to the inner surface 10a in an axial direction.

The base plate 10 includes the through hole 11 penetrating between the inner surface 10a and the outer surface 10b. The details of the through hole 11 will be described later. The base plate 10 defines the internal space S of the hard disk drive device 100 together with the cover (not illustrated).

An upper conical bearing member 31 and a lower conical bearing member 32 which have a conical outer surface are fixed to the shaft 30 to be spaced from each other in the axial direction. The rotor 50 includes a sleeve 51 having a shaft insertion hole 51a into which the shaft 30 is to be inserted, a hub 52 that is fixed to an outer peripheral surface of the sleeve 51, and a yoke 53 and a ring magnet 54 that are fixed to the inside of the hub 52. The ring magnet 54 is a permanent magnet magnetized in a state where the polarity is reversed in a peripheral direction. The yoke 53 is an annular member that prevents a magnetic flux of the ring magnet 54 from leaking out.

The shaft insertion hole 51a of the sleeve 51 includes an upper conical inner surface 51b at an upper end and a lower conical inner surface 51c at a lower end. The upper conical inner surface 51b and the conical outer surface of the upper conical bearing member 31 face each other through a minute gap, and the minute gap is filled with a lubricant. A dynamic pressure generating groove is formed on at least one of the upper conical inner surface 51b and the conical outer surface of the upper conical bearing member 31. Thus, a fluid dynamic pressure bearing portion 70 is formed on the upper side. Similarly, the lower conical inner surface 51c and the conical outer surface of the lower conical bearing member 32 face each other through a minute gap, and the minute gap is filled with a lubricant. A dynamic pressure generating groove is formed on at least one of the lower conical inner surface 51c and the conical outer surface of the lower conical bearing member 32. Thus, a fluid dynamic pressure bearing portion 70 is formed on the lower side.

With the above-described configuration, the rotor 50 is supported by the fluid dynamic pressure bearing portions 70 on the upper and lower sides on the inner surface 10a side of the base plate 10, during rotation of the rotor 50. On the inner surface 10a side of the base plate 10, the stator core 40 wound with the coil 41 is fixed to face the ring magnet 54.

The stator core 40 has a structure in which electromagnetic steel sheets processed to have an annular shape are stacked. The stator core 40 is disposed on an outer periphery side of the sleeve 51, and a plurality of pole teeth are provided to be spaced from one another in the peripheral direction of the stator core 40. The coil 41 is wound around each of the pole teeth. The conducting wire 42 is drawn out from the coil 41. The conducting wire 42 passes through the through hole 11 in the base plate 10, and is connected to the FPC board 60 which is attached to the outer surface 10b of the base plate 10 by soldering with a solder 61. The FPC board 60 is disposed on the outer surface 10b of the base plate 10 so that a right end portion of the FPC board 60 covers a part of the lower opening 13 of the through hole 11 and the FPC board 60 extends toward the left side (in direction away from the axis Y1). Thus, a control current is supplied from an output terminal of the FPC board 60 to the coil 41 through the conducting wire 42.

As polarity of the current supplied to the coil 41 is switched, the magnetic attractive force and the magnetic repulsive force generating between the ring magnet 54 and the pole teeth of the stator core 40 are switched, and the rotor 50 rotates with respect to the base plate 10 around the shaft 30 fixed to the base plate 10. When the rotor 50 rotates at a high speed, a dynamic pressure is generated in the fluid dynamic pressure bearing portion 70, and the rotor 50 rotates while being supported in a non-contact state with respect to the upper conical bearing member 31 and the lower conical bearing member 32.

Figure 3:
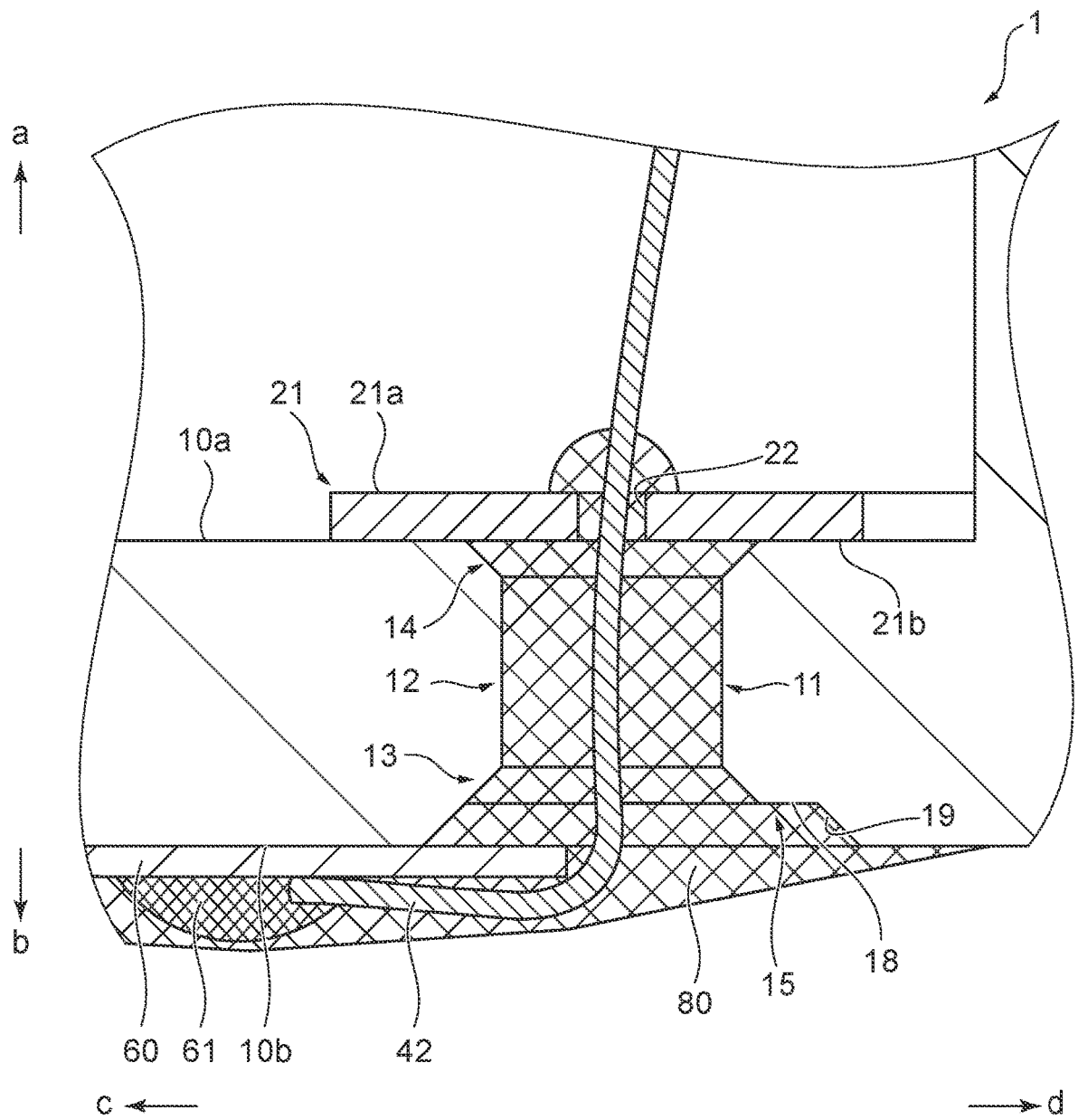
FIG. 3 is a partially enlarged cross sectional view schematically illustrating a configuration of a portion near a through hole in a base plate of the spindle motor illustrated in FIG. 2.
Figure 4:
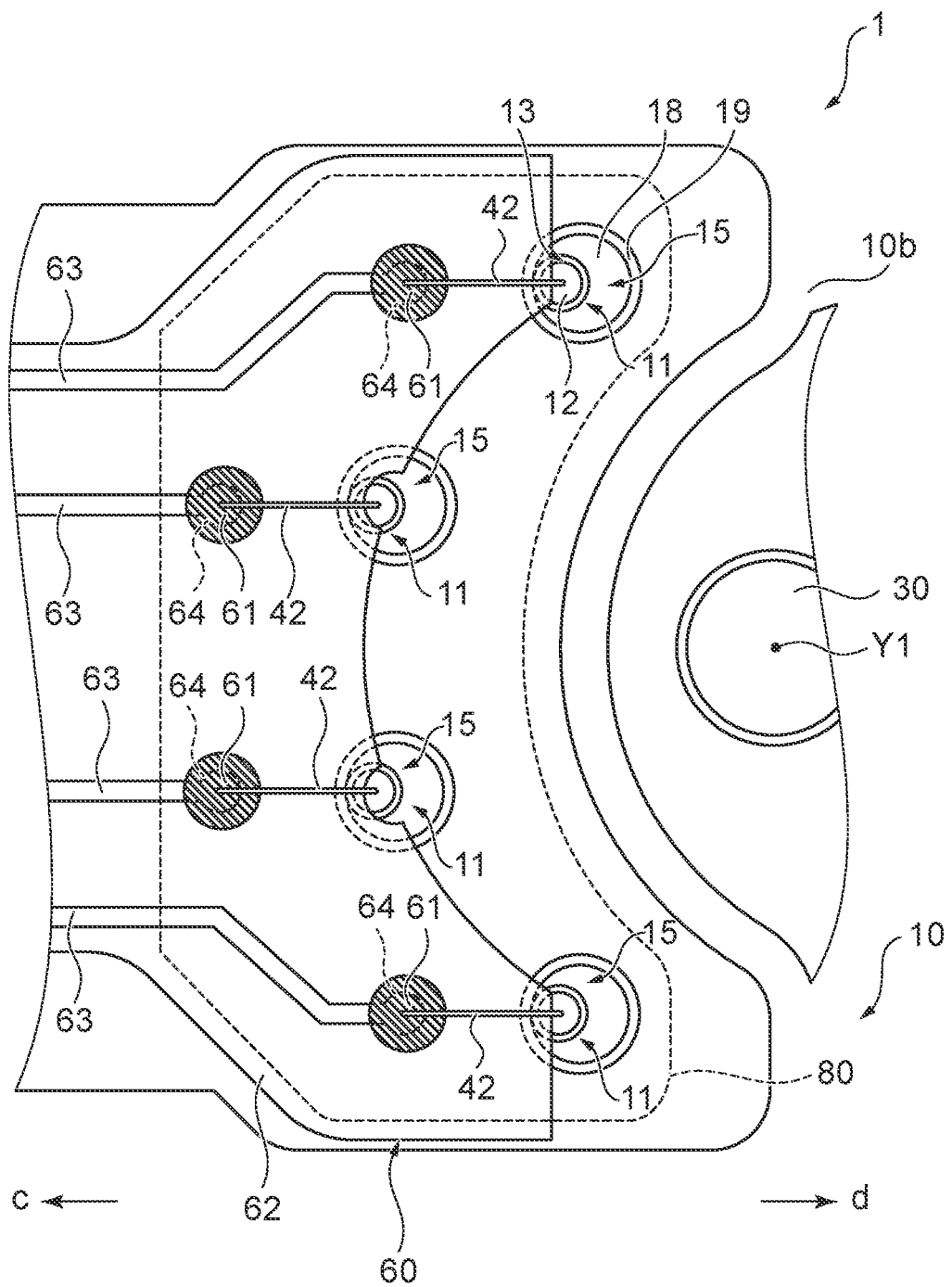
FIG. 4 is a partially enlarged view schematically illustrating a configuration of the base plate of the spindle motor illustrated in FIG. 2, as viewed from the bottom.

FIG. 3 is a partially enlarged cross sectional view schematically illustrating a configuration of a portion near the through hole 11 in the base plate 10 of the spindle motor illustrated in FIG. 2. FIG. 4 is a partially enlarged view schematically illustrating a configuration of the base plate 10 of the spindle motor 1 illustrated in FIG. 2, as viewed from the bottom. As illustrated in FIG. 3, the enlarged opening 15 in the base plate 10 is enlarged and extends at least in a direction away from the FPC board 60. That is, in the through hole 11 in the base plate 10, the enlarged opening 15 is formed to be connected to the lower opening 13, and the enlarged opening 15 is offset to extend toward a side where the FPC board 60 is not present (in a direction closer to the axis Y1). The through hole 11 is sealed with the sealing material 80 to fill a space from the lower opening 13 to the upper opening 14.

As illustrated in FIG. 3, the through hole 11 penetrating between the inner surface 10*a* and the outer surface 10*b* is formed in the base plate 10. The through hole 11 includes the cylindrical portion 12 as an intermediate portion extending in a cylindrical shape in parallel to the axial direction, the lower opening 13 as an outer opening that opens downward of the through hole 11, and the upper opening 14 as an inner opening that opens upward of the through hole 11.

The lower opening 13 of the through hole 11 can be a chamfered portion or a counterbored portion that is coaxial with the cylindrical portion 12. For example, as illustrated in FIG. 3 and FIG. 4, the lower opening 13 may be a chamfered portion that extends annularly to be continuous with the lower end of the cylindrical portion 12 of and be coaxial with the cylindrical portion 12. In this case, the lower opening 13 is an inclined surface having a diameter increasing downward from the lower end of the cylindrical portion 12.

The enlarged opening 15 illustrated in FIG. 3 has a tapered surface 19 which is an inclined inner peripheral surface so that the opening area is increased from the inside toward the outside of the base plate 10. The enlarged opening 15 also has a flat surface 18 that is connected to the tapered surface 19 and extends in a radial direction of the through hole 11. The enlarged opening 15 can be formed in, for example, a circular shape or an oblong shape in a plan view.

More specifically, the enlarged opening 15 includes the flat surface 18 extending in the longitudinal direction of the base plate 10, and the tapered surface 19 formed in an annular shape having a diameter increasing from the inside to the outside of the base plate 10. The flat surface 18 extends in a circular shape in a plan view, and is connected to the lower end of the lower opening 13.

In FIG. 4 illustrating the base plate 10 as viewed from the bottom in a plan view, the outer periphery of the flat surface 18 is formed in a circular shape. A center axis of the flat surface 18 (a center of an outer peripheral circle) is different from a center axis of the cylindrical portion 12 and the lower opening 13, and is positioned more on the right side (in a direction of an arrow d) than the center axis of the cylindrical portion 12 and the lower opening 13. The diameter of the flat surface 18 is larger than the diameter at the bottom of the lower opening 13. Note that the center axis of the flat surface 18 is not limited to the case where the center axis is positioned on the right side of the center axis of the cylindrical portion 12 and the lower opening 13, and it is only required that the flat surface 18 is offset to extend toward a side where the FPC board 60 is not present.

The tapered surface 19 extends annularly around the flat surface 18, and the inner periphery of the tapered surface 19 coincides with the outer periphery of the flat surface 18. The tapered surface 19 is an annular surface that is coaxial with the flat surface 18, and the outer diameter of the tapered surface 19 is larger than the outer diameter of the flat surface 18. The tapered surface 19 is an inclined surface having a diameter increasing downward from the outer periphery of the flat surface 18.

The tapered surface 19 extends at the same angle as the lower opening 13, and is connected to the lower opening 13 in at least a portion on the left side (in a direction of an arrow c in FIG. 4) in the longitudinal direction of the base plate 10.

As illustrated in FIG. 4, the left side of the inner periphery of the tapered surface 19 contacts the left side of the outer periphery of the lower opening 13. Therefore, the tapered surface 19 is connected to the lower side of the lower opening 13 in the left side of the inner periphery of the tapered surface 19. Note that the left side of the inner periphery of the tapered surface 19 may be connected to the lower opening 13 through the flat surface 18.

The center axis of the enlarged opening 15 is different from the center axis of the cylindrical portion 12 and the lower opening 13, and is positioned more on the right side (in a direction of an arrow d) than the center axis of the cylindrical portion 12 and the lower opening 13. A left end of the inner periphery of the tapered surface 19 is positioned more on the right side as compared with the case where the center axis of the enlarged opening 15 and the center axis of the cylindrical portion 12 and the lower opening 13 are coaxial with each other. Therefore, as described later, an amount of the sealing materials 80 positioned between the enlarged openings 15 and the FPC board 60 can be reduced in the case where a right end of the FPC board 60 is positioned near centers of the cylindrical portion 12 of respective four through holes 11 in the base plate 10. Therefore, in the gap between the enlarged opening 15 and the FPC board 60, the sealing material 80 can sufficiently flow into the end on the left side of the outer periphery of the tapered surface 19, whereby air bubbles can be inhibited from remaining.

As illustrated in FIG. 3, the upper opening 14 has a diameter increasing from the cylindrical portion 12. The upper opening 14 extends annularly, and is connected to the upper end of the cylindrical portion 12. The upper opening 14 is coaxial with the cylindrical portion 12 and the lower opening 13, and the maximum diameter of the upper opening 14 is larger than the diameter of the cylindrical portion 12. That is, the upper opening 14 is a conical surface having a diameter increasing upward from the upper end of the cylindrical portion 12.

Here, for example, in the case where the enlarged openings 15 corresponding to the respective through holes 11 adjacent to one another are connected to one another while sharing the flat surface 18, a part of the sealing material 80 may flow to the adjacent through hole 11 side through the flat surface 18, not toward the corresponding cylindrical portion 12, whereby the workability for filling the corresponding through hole with the sealing material 80 may be deteriorated. In contrast, in the spindle motor 1 according to an embodiment of the present disclosure, the enlarged openings 15 of the respective through holes 11 are formed independently without being connected to one another. This can prevent the sealing material 80 from flowing to the adjacent through hole 11 side when the sealing material 80 fills the through holes 11, whereby the workability for filling each of the through holes 11 with the sealing material 80 can be improved.

As illustrated in FIG. 4, in the outer surface 10*b* of the base plate 10, the FPC board 60 covers a part of the lower opening 13 from the left side in the longitudinal direction of the base plate 10. That is, the FPC board 60 covers the lower opening 13 from the left side of the lower opening 13 to a position near the center of the cylindrical portion 12.

The FPC board 60 is fixed to the outer surface 10*b* of the base plate 10 by adhesive. For example, in the FPC board 60, a wiring pattern 63 made of a copper foil and the like is formed on a base material 62 which is formed with using a film-shaped insulator made of polyimide. A terminal 64 in which a part of the wiring pattern 63 is exposed is formed on a surface of the FPC board 60.

As illustrated in FIG. 4, the end surface on the right side of the FPC board 60 in the longitudinal direction of the base plate 10 is positioned to be disposed near the center of the cylindrical portion 12, and then the FPC board 60 is adhesively fixed to the outer surface 10b of the base plate 10. The conducting wire 42 drawn out from the coil 41 of the stator core 40 is electrically connected to the terminal 64 of the FPC board 60 through the corresponding through hole 11, and is soldered with a solder 61.

As illustrated in FIG. 3, an insulation film 21 is provided on the inner surface 10a of the base plate 10. A conducting wire introducing hole 22 is formed in the insulation film 21. The conducting wire 42 is connected to the FPC board 60 through the conducting wire introducing hole 22 and the through hole 11. That is, the spindle motor 1 further includes the insulation film 21 that is provided inside of the base plate 10 so as to cover the through hole 11 and has the conducting wire introducing hole 22 leading to the through hole 11. The sealing material 80 projects to the inside of the base plate 10 from the interior of the through hole 11 through the conducting wire introducing hole 22, to seal the conducting wire introducing hole 22.

The insulation film 21 is fixed to the inner surface 10a of the base plate 10 by the adhesive. The insulation film 21 is, for example, a film-shaped insulator made of polyimide, and is an annular member formed in an annular shape centered around the axis Y1. In the insulation film 21, the conducting wire introducing hole 22 penetrating the insulation film 21 in the axial direction is formed at a position corresponding to the through hole 11 in the base plate 10. The conducting wire introducing hole 22 is positioned to be aligned with the through hole 11, and then the insulation film 21 is fixed to the inner surface 10a of the base plate 10.

The width in the radial direction of the insulation film 21 which is an annular member is larger than the diameter of the upper opening 14 in the base plate 10. The conducting wire introducing hole 22 is positioned to be substantially coaxial with the upper opening 14 in the base plate 10, and the diameter of the conducting wire introducing hole 22 is smaller than the diameter of the upper opening 14 and the diameter of the cylindrical portion 12.

The through hole 11 is sealed by the sealing material 80. The sealing material 80 is made of, for example, a thermosetting resin as illustrated in FIG. 3, and fills the upper opening 14, the cylindrical portion 12, the lower opening 13, and the enlarged opening 15 in the base plate 10, and is cured.

The sealing material 80 also seals the conducting wire introducing hole 22, and covers a part of an upper surface 21a of the insulation film 21 including the conducting wire introducing hole 22, and is cured. The sealing material 80 is cured so that the conducting wire 42 drawn out from the coil 41 of the stator core 40 is positioned near the center axis of the upper opening 14, the cylindrical portion 12, and the lower opening 13.

Furthermore, as indicated by a region surrounded by a dashed line in FIG. 4, in the outer surface 10b of the base plate 10, the sealing material 80 is cured covering a part of the outer surface 10b including the through hole 11 and the enlarged opening 15. Furthermore, the sealing material 80 is cured covering the conducting wire 42 drawn out from the coil 41 of the stator core 40 and a part of the FPC board 60 including the solder 61 and the wiring pattern 63.

Thus, in the spindle motor 1 according to an embodiment of the present disclosure, the enlarged opening 15 which is connected to the lower opening 13 of the through hole 11 in the base plate 10 is formed, and the enlarged opening 15 is offset to extend toward a side where the FPC board 60 is not present. As a result, the enlarged opening 15 opens outward in a state where a larger area of the enlarged opening 15 is uncovered with the FPC board 60 as compared with the case where the enlarged opening 15 is coaxial with the lower opening 13. Therefore, when the through hole 11 is filled with the sealing material 80, the sealing material 80 can easily flow into the through hole 11 through the enlarged opening 15 with a larger uncovered area.

Thus, in the spindle motor 1 according to an embodiment of the present disclosure, providing the enlarged opening 15 enables the sealing material 80 to flow into the cylindrical portion 12 of the through hole 11 more easily than in the case where the sealing material 80 directly flows into the cylindrical portion 12 of the through hole 11. Furthermore, in the spindle motor 1, the enlarged opening 15 has the flat surface 18 which is connected to the inclined tapered surface 19, and therefore when the sealing material 80 flows into the enlarged opening 15, the rate at which the sealing material 80 flows into the cylindrical portion 12 is slower as compared with the case where the sealing material 80 directly flows into the cylindrical portion 12 of the through hole 11. Therefore, air bubbles can be inhibited from being caught in the sealing material 80, and the air bubbles are easily discharged even when the air bubbles are caught in the sealing material 80, thereby reducing the possibility of the formation of air bubbles in the cured sealing material 80. In the spindle motor 1, this can inhibit the sealing material 80 from being cracked by the thermal expansion of the air bubbles and thus prevent gas such as helium gas from leaking out of the hard disk drive device 100 through these cracks.

Thus, in the spindle motor 1 according to an embodiment of the present disclosure, the sealing performance of the through hole 11 in the base plate 10 can be improved.

In the spindle motor 1 according to an embodiment of the present disclosure, a part of the lower opening 13 of the through hole 11 is covered with the FPC board 60. That is, as illustrated in FIG. 4, in the outer surface 10b of the base plate 10, the FPC board 60 covers a part of the lower opening 13 of the through hole 11 from the left side to the position near the center of the cylindrical portion 12.

Thus, the conducting wire 42 drawn out from the coil 41 of the stator core 40 contacts the end surface of the FPC board 60 to keep the conducting wire 42 positioned near the center axis of the upper opening 14, the cylindrical portion 12, and the lower opening 13. This can inhibit the air bubbles from being formed between the conducting wire 42 and the inner peripheral surface of the cylindrical portion 12 due to the proximity of the conducting wire 42 to the inner peripheral surface of the cylindrical portion 12. Furthermore, this can inhibit electrical shorting due to contact of the conducting wire 42 with the inner peripheral surface of the cylindrical portion 12. Even when nearly half of the through hole 11 is covered with the FPC board 60 as mentioned above, the sealing material 80 can easily flow through the enlarged opening 15.

In the spindle motor 1 according to an embodiment of the present disclosure, the tapered surface 19 extends at the same angle as the lower opening 13, and is connected to the lower opening 13 in at least a portion on the left side in FIG. 4. Thus, the possibility of the formation of air bubbles between a portion of the lower opening 13 covered with the FPC board 60 and the FPC board 60 can be further reduced.

The spindle motor 1 according to an embodiment of the present disclosure further includes the insulation film 21 that is provided inside of the base plate 10 so as to cover the through hole 11, and in which the conducting wire introducing hole 22 leading to the through hole 11 is formed. The sealing material 80 seals the conducting wire introducing hole 22 and covers the conducting wire introducing hole 22 from the inside of the base plate 10. Thus, the sealing performance of the through hole 11 can be improved as compared with the case where the sealing material 80 is present only in the through hole 11 in the base plate 10, and the airtightness of the internal space S in the hard disk drive device 100 can be further improved.

In the spindle motor 1 according to an embodiment of the present disclosure, the center axis of the enlarged opening 15 is positioned more on the right side than the center axis of the cylindrical portion 12 and the lower opening 13. Furthermore, in the spindle motor 1, the left end of the outer periphery of the tapered surface 19 is positioned more on the right side as compared with the case where the center axis of the enlarged opening 15 and the center axis of the cylindrical portion 12 and the lower opening 13 are coaxial with each other. This reduces the volume of the gap between the enlarged opening 15 and the FPC board 60, thereby enabling an amount of the sealing materials 80 put into the gap to be reduced. Therefore, in the gap between the enlarged opening 15 and the FPC board 60, the sealing material 80 can sufficiently flow into the left end of the outer periphery of the tapered surface 19, whereby air bubbles can be inhibited from remaining.

In the spindle motor 1 according to an embodiment of the present disclosure, the enlarged openings 15 of the respective through holes 11 adjacent to one another are formed independently. This can prevent the sealing material 80 from flowing to the adjacent through hole 11 when the sealing material 80 is put into the through holes 11, whereby the workability for filling each of the through holes with the sealing material 80 can be improved.

Although embodiments of the present disclosure have been described above, the present disclosure is not limited to the above-described embodiments, and all aspects that fall within the concepts of the present disclosure and the claims are included. In addition, the respective components may be selectively combined as appropriate in order to achieve at least part of the above-described effects. For example, the shape, materials, arrangement, size, and the like of each component in the above-described embodiments can be appropriately modified according to the specific usage mode of the present disclosure.

Figure 5:
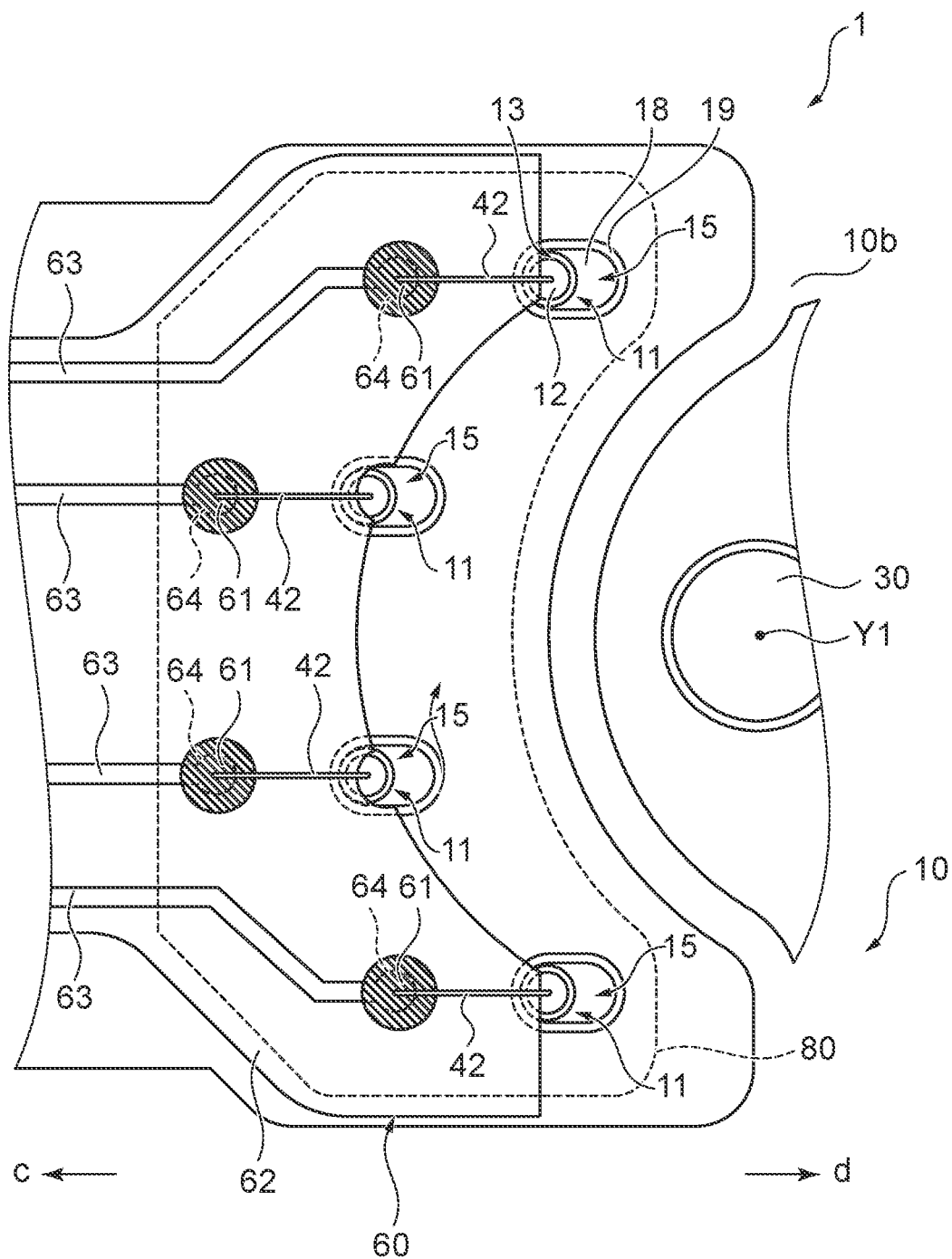
FIG. 5 is a partially enlarged view schematically illustrating a configuration of the base plate of a variant of the spindle motor of the hard disk drive device according to the embodiment of the present disclosure, as viewed from the bottom.

Note that in the spindle motor 1 according to an embodiment of the present disclosure, the description about an embodiment of the present disclosure has been made by taking an example in which the enlarged opening 15 is formed in a circular shape in a plan view. However, the present disclosure is not limited to this shape. For example, as illustrated in FIG. 5, the enlarged opening 15 may be formed in an oblong shape in a plan view, and it is only required that the enlarged opening 15 is offset to extend toward a side where the FPC board 60 is not present.

Figure 6:
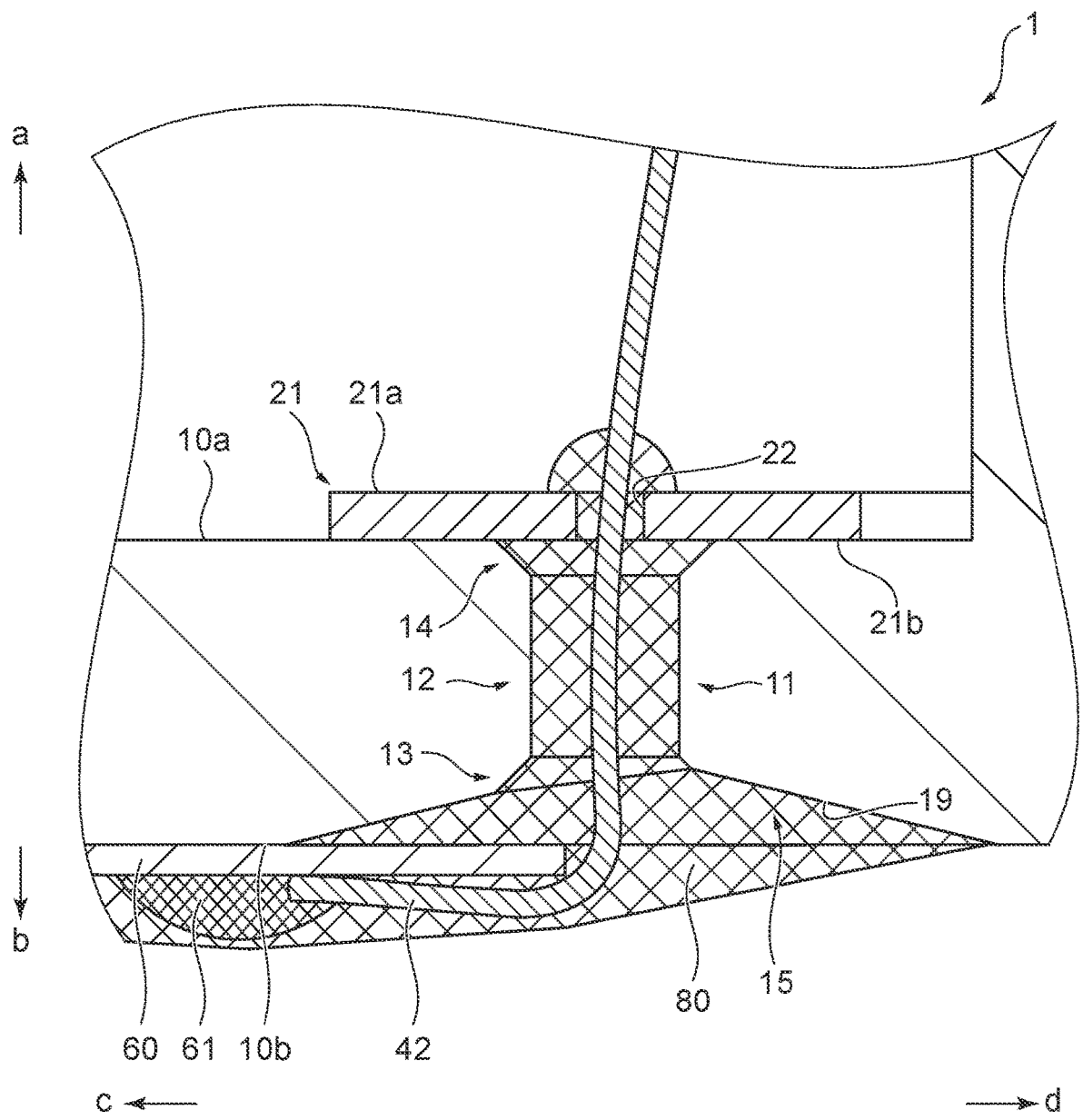
FIG. 6 is a partially enlarged cross sectional view schematically illustrating a configuration of a portion near a through hole in a base plate of a variant of the spindle motor of the hard disk drive device according to the embodiment of the present disclosure.
Figure 7:
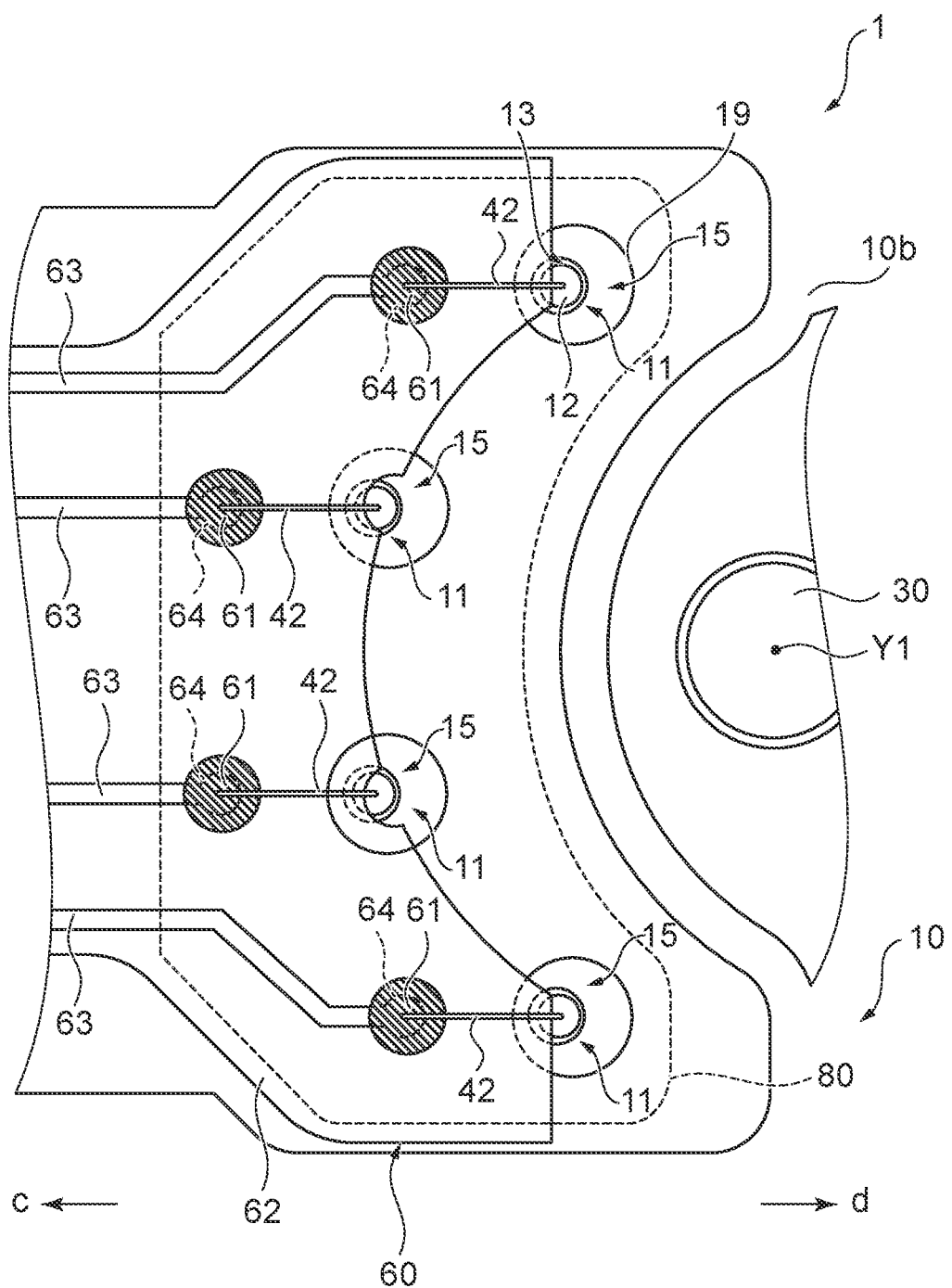
FIG. 7 is a partially enlarged view schematically illustrating a configuration of the base plate of a variant of the spindle motor of the hard disk drive device according to the embodiment of the present disclosure, as viewed from the bottom.

In the spindle motor 1, the description about an embodiment of the present disclosure has been made by taking an example in which the enlarged opening 15 has the flat surface 18 and the tapered surface 19. However, the present disclosure is not limited thereto, for example, as illustrated in FIG. 6 and FIG. 7, the enlarged opening 15 may not have the flat surface 18. In the embodiment illustrated in the cross sectional view of FIG. 6, the flat surface 18 is omitted, and only the lower opening 13 is provided between the tapered surface 19 and the cylindrical portion 12. The tapered surface 19 extends to be inclined at an angle larger than that of the lower opening 13. In the plan view of FIG. 7, the enlarged opening 15 in a circular shape and the cylindrical portion 12 in a circular shape are not coaxial with each other, and the center of the enlarged opening 15 is offset from the center of the cylindrical portion 12 toward a side where the FPC board 60 is not present. In this way, the enlarged opening 15 may be offset to extend toward a side where the FPC board 60 is not present.

Figure 8:
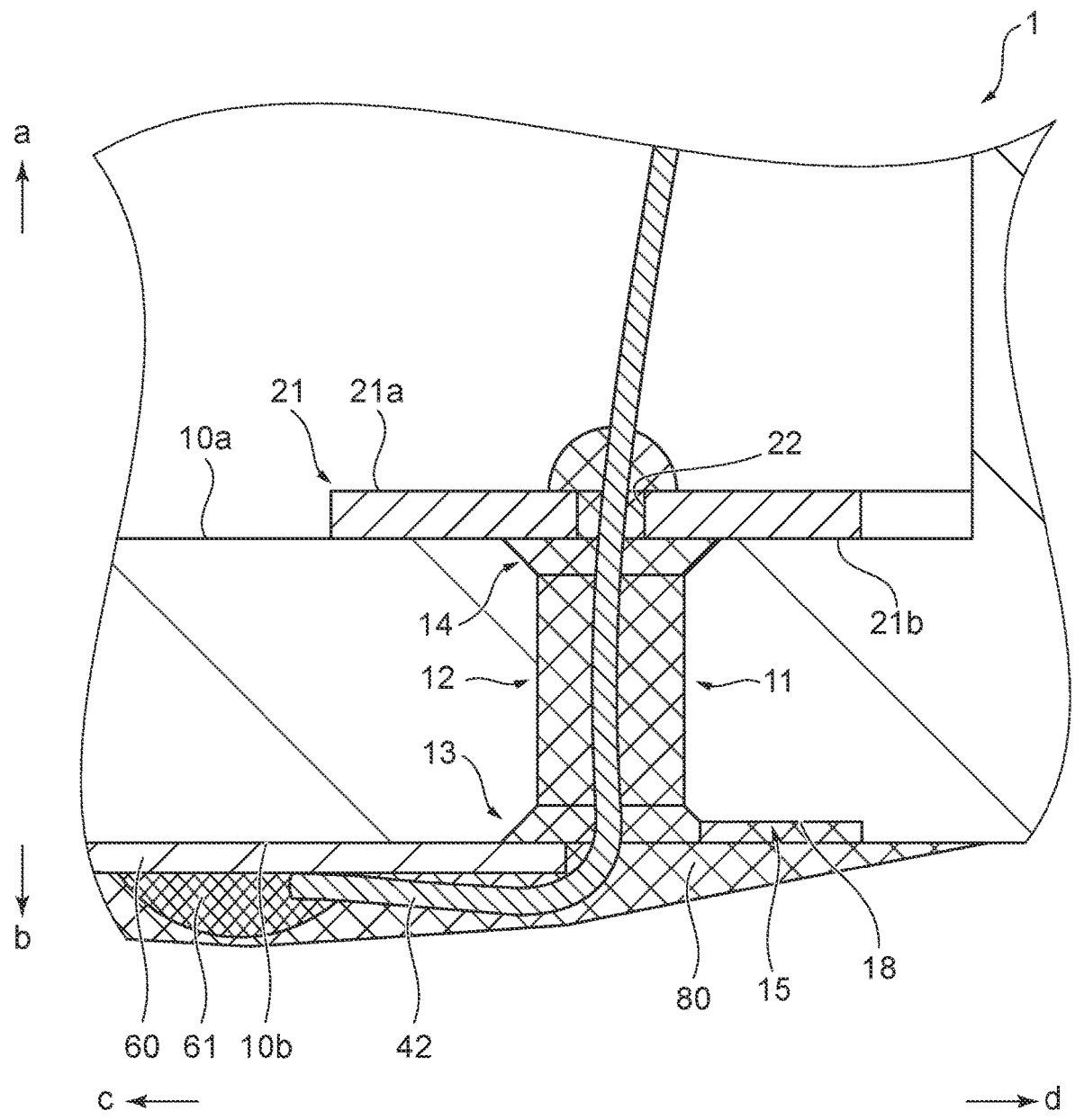
FIG. 8 is a partially enlarged cross sectional view schematically illustrating a configuration of a portion near a through hole in a base plate of a variant of the spindle motor of the hard disk drive device according to the embodiment of the present disclosure.
Figure 9:
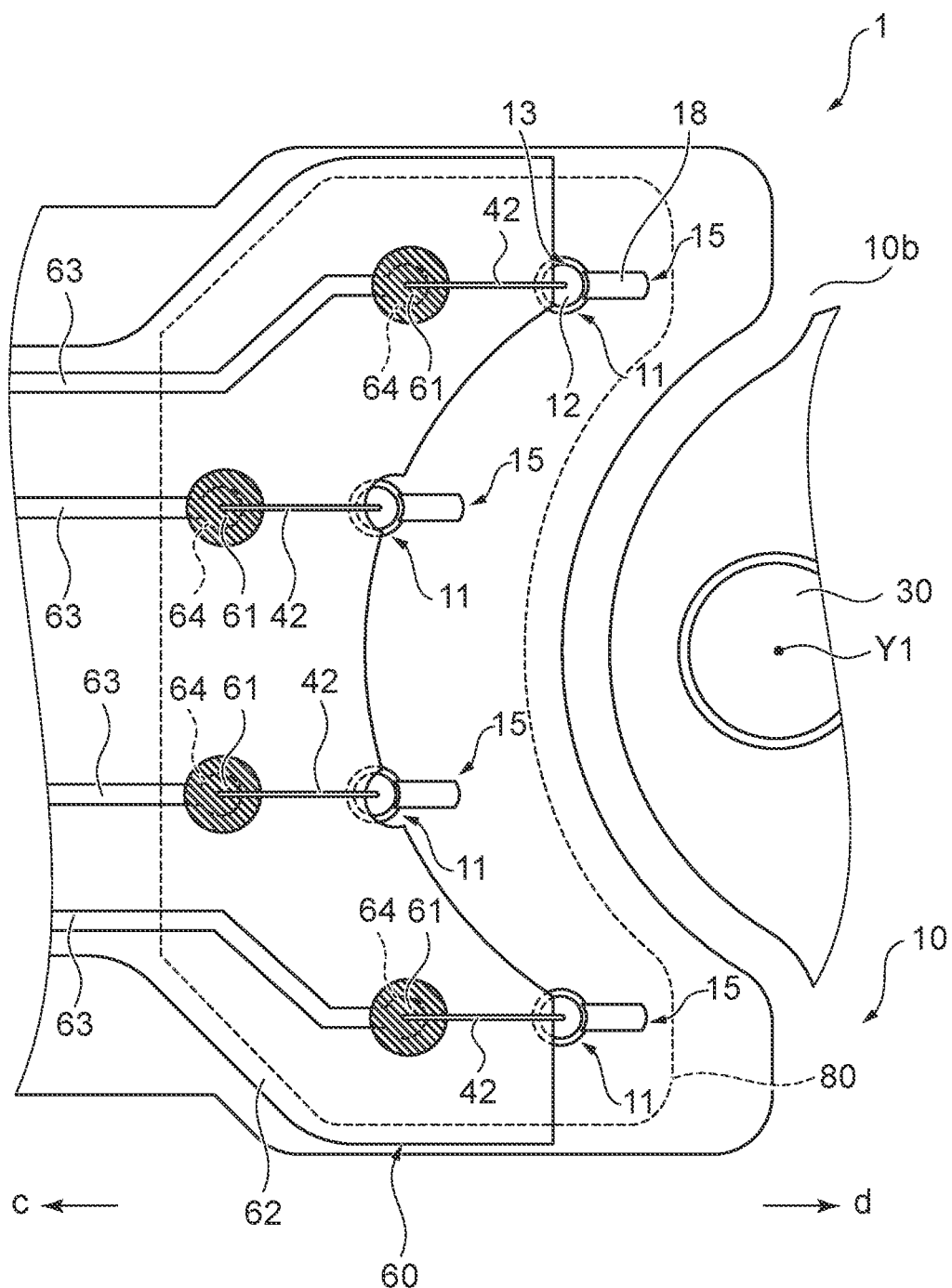
FIG. 9 is a partially enlarged view schematically illustrating a configuration of the base plate of a variant of the spindle motor of the hard disk drive device according to the embodiment of the present disclosure, as viewed from the bottom.

In addition, as illustrated in FIG. 8 and FIG. 9, the enlarged opening 15 may be connected to the right side of the lower opening 13, and may be a recessed portion that extends in a rectangular shape in a plan view to the right side from the lower opening 13. Also in this case, the direction in which the enlarged opening 15 extends is not limited to the longitudinal direction of the base plate 10, and it is only required that the enlarged opening 15 is offset to extend toward a side where the FPC board 60 is not present.

What is claimed is:
1. A spindle motor, comprising:
a base plate in which a through hole is formed;
a stator core that is provided inside of the base plate and is wound with a coil; and
a circuit board that is provided outside of the base plate and to which a conducting wire of the coil drawn out to outside through the through hole is connected,
wherein the through hole includes an inner opening that opens inward of the base plate, an outer opening that opens outward of the base plate, and an intermediate portion having a cylindrical shape that is provided between the inner opening and the outer opening,
an enlarged opening is formed to be connected to the outer opening,
a center of the enlarged opening is shifted from a center of the intermediate portion toward a side where the circuit board is not present, and
the through hole is sealed with a sealing material.
2. The spindle motor according to claim 1, wherein the outer opening of the through hole is a chamfered portion or a counterbored portion that is coaxial with the intermediate portion.
3. The spindle motor according to claim 1, wherein a part of the outer opening of the through hole is covered with the circuit board.
4. The spindle motor according to claim 1, wherein the enlarged opening has an inclined inner peripheral surface so that an opening area is increased from an inside toward an outside of the base plate.
5. The spindle motor according to claim 1, wherein the enlarged opening has a flat surface extending in a radial direction of the through hole.
6. The spindle motor according to claim 1, wherein the enlarged opening is formed in a circular shape or an oblong shape in a plan view.
7. The spindle motor according to claim 1, further comprising:
an insulation film that covers the through hole and is provided inside of the base plate, and in which a conducting wire introducing hole leading to the through hole is formed,
wherein the sealing material seals the conducting wire introducing hole and covers the conducting wire introducing hole from the inside of the base plate.

* * * * *